April 21, 1936. E. H. WEBER 2,037,954
SIDE DRIVING BELT
Filed Aug. 11, 1934
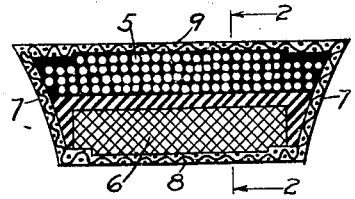
Fig. 1
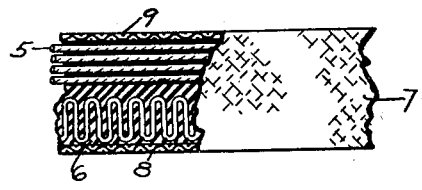
Fig. 2
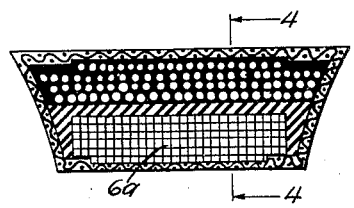
Fig. 3
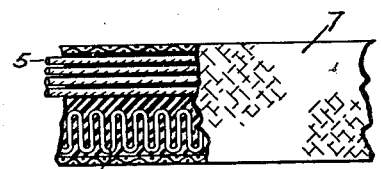
Fig. 4
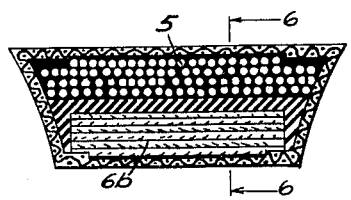
Fig. 5
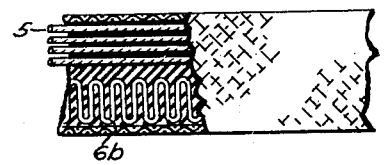
Fig. 6
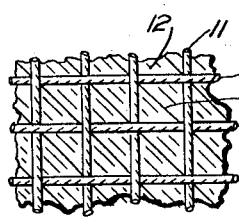
Fig. 7   Fig. 8
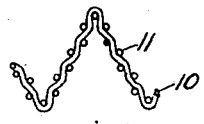
Fig. 11
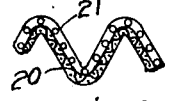
Fig. 12
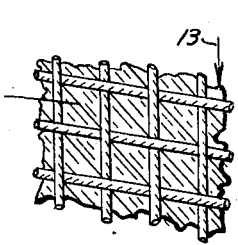
Fig. 9   Fig. 10
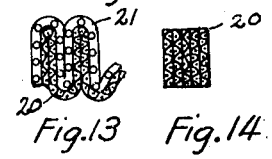
Fig. 13   Fig. 14
Inventor
Eugene H. Weber
By 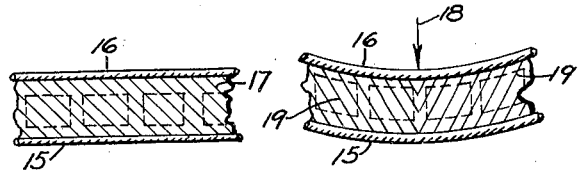
Attorney Patented Apr. 21, 1936

2,037,954

UNITED STATES PATENT OFFICE 2,037,954

SIDE DRIVING BELT

Eugene H. Weber, Denver, Colo., assignor to The Gates Rubber Company, Denver, Colo., a corporation of Colorado Application August 11, 1934, Serial No. 739,392

9 Claims. (Cl. 74—233)

This invention relates to improvements in side driving belts of the V-type.

In the transmission of power, the use of side driving belts is becoming very popular and when these belts are employed for the transmission of heavy loads they must be of sufficient strength to withstand the tensional strains and since the limit of thickness is soon reached, due to the fact that the stretching and compression of belts beyond a certain thickness produces internal strains and develops heat to such an extent that they are impractical; when they exceed a very limited thickness it has been found necessary to obtain the necessary strength by making wider belts.

Where wide belts of the side driving type are employed, the tensional strains tend to flex the belt inwardly towards the pulley and this flexure is very objectionable for the reason that, in the first place, it develops undesirable strains and in the second place, it changes the pressure between the driving surfaces of the belt and the pulley.

It is the object of this invention to produce a side driving belt of the V-type and of considerable width that shall be so constructed that the transverse flexure will be limited to such an extent that it will not interfere with the successful operation of the belt.

This invention, briefly described, consists of a belt of the type specified in which the body of the belt is provided with a core of substantially inextensible cords that run in the length of the belt and which serve to resist the tensional strains. For the purpose of resisting bending forces and for the purpose of holding the belt as nearly straight as possible in a transverse direction, the belt is provided with a layer which serves as a brace or beam and which is formed from rubberized fabric, either woven fabric or latex coated cord fabric which is pleated in such a way that the plane of the different layers extend transversely of the longitudinal axis of the belt. This brace or supporting layer is arranged in the body of the belt on the side of the cord core nearest to the pulley. In this specification and in the claims the side nearest the pulley will be referred to as "the inner side", while the side farthest from the pulley will be referred to as "the outer side"; while the surface of the belt will be referred to as the outside of the belt. The cord core and the transverse brace layer are enclosed by a suitable fabric covering in a manner which will be apparent as the description proceeds.

Having thus briefly described the construction of the belt and the purpose of the invention, the belt will now be described in detail and for this reason reference will be had to the accompanying drawing in which the preferred embodiment of the belt has been illustrated, and in which:

Fig. 1 is a transverse section through the improved belt showing the brace in place therein;

Fig. 2 is a view partly in side elevation and partly in section, taken on line 2—2, Fig. 1, and shows the arrangement of the cord core and the transverse brace element;

Fig. 3 is a transverse section similar to that shown in Fig. 1, but shows the transverse brace element made from straight cut woven fabric;

Fig. 4 is a view similar to that shown in Fig. 2, the section being taken on line 4—4, Fig. 3;

Fig. 5 is a transverse section similar to that shown in Figs. 1 and 2, and shows a belt in which the brace element is formed from latex treated cords that are pleated and arranged so that the cords extend parallel with the transverse axis of the belt;

Fig. 6 is a view partly in elevation, and partly in section, the section being taken on line 6—6, Fig. 5;

Fig. 7 is a view, greatly magnified, showing a woven fabric construction in the interstices or openings between the threads or cords filled with rubber composition;

Fig. 8 is a view similar to that shown in Fig. 7, but shows the fabric distorted by pressure so as to change the shape of the openings between the cords from cubes to rhombs.

Fig. 9 is a view greatly modified showing two adjacent cords connected with latex;

Fig. 10 shows the cords illustrated in Fig. 9 deformed by pressure and indicates the direction of the strains set up by the bending forces;

Fig. 11 is a view showing the manner in which the fabric forming the brace element is pleated;

Fig. 12 is a view showing a brace element formed from woven fabric and cord fabric pleated in the manner in which this element is formed for this purpose;

Fig. 13 shows the separate pleats illustrated in Fig. 12 compressed so as to lie parallel to each other; and Fig. 14 shows a cross section through a portion of the transverse brace element and shows how the latter can be made from a plurality of separate flat strips held together by rubber composition.

In the drawing reference numeral 5 designates the inextensible cords from which the tension resisting core is formed. This core is usually built up by superimposing several layers of latex treated cord fabric on each other in such a way that the cords run in the direction of the longitudinal axis of the belt. The different cords are separated by the latex and in actual construction are quite close to each other, but have been shown as spaced apart in the drawing in order to facilitate the making of the drawing. Located on the pulley side of the cord core is a brace member or element 6 which is preferably pleated from a rubberized fabric which may be either woven or latex treated cords as the case may be. In Fig. 1 the element 6 is made from bias cut woven fabric which has been pleated so as to assume the shape shown in Fig. 2. It will be noticed in Fig. 2 that the fabric strip is illustrated as if the sides were spaced apart a considerable distance, but this is merely for the purpose of facilitating the drawing and making it clear as this brace element has its adjacent folds pressed against each other so as to form a structure resembling that shown in Fig. 13. The different layers are separated by the layers of rubber composition whose thickness has been exaggerated in the drawing. The belt is covered on the outside with bias cut woven fabric and the sides 7, which are concave, are formed from several thicknesses while the inner surface 8 has only a single covering of fabric and this is also true of the outer surface 9. In Figs. 3 and 4, a slightly modified form has been shown in which the brace element, which has been designated by reference character 6a is made from straight cut, rubberized woven fabric in which some of the threads run parallel with the transverse axis, while the other threads run in the direction of the length of the belt, otherwise the belt illustrated in Figs. 3 and 4 is the same as that illustrated in Figs. 1 and 2.

In Figs. 5 and 6 another modification has been shown in which the brace element which has been designated by reference character 6b is made from latex treated cord fabric in which the cords are arranged so that they extend parallel to the transverse axis of the belt. After the belt has been assembled and covered, it is placed in a suitable mold and vulcanized. The action of the heat on the rubber composition is such that after the vulcanizing has taken place the brace elements 6, 6a and 6b become quite stiff and are very well adapted to resist transverse bending strains.

In Fig. 7 a greatly magnified view of a small section of woven fabric has been shown. In this view the cords designated by reference numeral 10 may be considered as the warp, while those designated by reference numerals 11 may be considered as the weft. The fabric is impregnated with a rubber composition which has been designated by reference numeral 12 and the openings between the cords are normally squares or rectangles.

In Fig. 8 the fabric illustrated in Fig. 7 is supposed to have been acted upon by force 13 in such a way as to change the shape or squares between the threads into rhombs and in so doing the diagonals which have been designated by reference numeral 14 are lengthened and this sets up forces that tend to resist the bending action, and after the rubber composition has been properly vulcanized, a strip made from a large number of thicknesses of rubberized fabric pleated as shown in the drawing will be capable of resisting large bending forces.

In Figs. 9 and 10, two parallel cords 15 and 16 have been shown as connected by latex or rubber composition 17. The connecting member 17 forms the web of what may be considered to be an I-beam in which the cords 15 and 16 are the flanges. When the force 18 acts upon the beam construction shown in Fig. 9, it will produce flexure and this, in turn, will lengthen the diagonals 19 in such a way as to set up forces opposing the bending forces and a brace strip constructed from such material and inserted in a belt in the manner described gives a very effective resistance against transverse flexure.

In Fig. 11 a diagrammatic view has been shown which is intended to illustrate more clearly the manner in which the fabric strip is bent or pleated. After the pleats are formed of the proper width, they are forced together so as to form a structure in which the several layers are parallel and as close together as possible. In Figs. 12 and 13 two sections have been shown in which the brace element has been formed from a layer 20 of woven fabric and a layer 21 of latex treated cord fabric. After the two strips have been pleated and pressed together, they assume the shape somewhat as shown in Fig. 13, and this element is usually made in a long band and can be applied to the belt making machine before the tension core is put in place.

Since belts of the kind described are always subject to severe flexures in cooperating with pulleys, it is evident that they should be as pliable as possible without sacrificing strength or wearing qualities and when the brace element is constructed in the manner described, it permits quite free flexure of the belt and thereby reduces the heat developed during the operation for the reason that it reduces the internal strains.

Attention is called to the fact that the driving sides 7 are slightly concave so that they will fit against the driving surfaces of the pulleys when the belt is operating as the compression of the material tends to straighten the sides when the belt is curved around a pulley.

Attention is called at this point to the fact that the brace member can be made of rubberized fabric either woven or latex treated cords and the woven fabric can be cut on the bias as shown in Fig. 1, or straight cut as shown in Fig. 3.

Attention is also called to the fact that the brace element has fabric layers that extend transversely of the belt and lie in planes substantially perpendicular to the longitudinal axis of the belt.

When the term "transverse axis" is employed in the specification and claims, it is intended to represent the neutral axis of the belt and is a plane lying between the inner and outer surfaces and parallel with both.

The brace member can be made by binding a fabric or cord strip back and forth or it may be made from a plurality of separate pieces placed side to side as shown in Fig. 14.

Having described the invention what is claimed as new is:

1. A side driving belt of the V-type having a tension resisting core formed from substantially inextensible cords that extend in the direction of the length of the belt, and a transverse flexure resisting element, located on the pulley side of the core formed from rubberized fabric in which the fabric is arranged in transversely extending layers whose planes are substantially perpendicular to the longitudinal neutral plane of the belt and in which the fabric is woven and arranged with its warp and woof threads extending at an angle to the transverse axis of the belt.

2. A side driving belt of the V-type having a tension resisting core formed from substantially inextensible cords that extend in the direction of the length of the belt, and a transverse flexure resisting element, located on the pulley side of the core, formed from woven rubberized fabric in which the fabric is arranged in layers whose planes are substantially perpendicular to the longitudinal neutral plane of the belt and in which the threads forming the warp and woof are so arranged that one set extends parallel with the transverse axis of the belt and the other set extends at right angles to the first.

3. A side driving belt of the V-type comprising a body formed from rubber composition and fibrous material, the belt having a tension resisting core formed from a plurality of layers of cord fabric in which the cords extend in the direction of the longitudinal axis of the belt, and a brace for resisting transverse flexure, said brace comprising an elongated strip of pleated rubberized fabric in which the pleats are at right angles to the longitudinal neutral plane of the strip, and in which the strip is located on the pulley side of the tension core.

4. A side driving belt of the V-type having a tension resisting core formed from substantially inextensible cords that extend in the direction of the length of the belt and a transverse flexure resisting element, located on the pulley side of the core, said element consisting of a continuous band extending the length of the belt and of a width substantially equal to the width of the belt, the band being formed from laminations of rubberized fabric positioned side by side, the planes of the laminations being perpendicular to the length of the band.

5. A side driving belt of the V-type having a tension resisting core formed from substantially inextensible cords that extend in the direction of the length of the belt, and a continuous transverse flexure resisting element located on the pulley side of the core, formed from pieces of rubberized fabric having substantially parallel threads impregnated with rubber composition, the element being composed of attached laminations of fabric lying in planes perpendicular to the longitudinal neutral plane of the band and the belt and in which the threads extend transversely of the belt and parallel with the neutral plane thereof.

6. A side driving belt of the V-type having a longitudinal tension resisting core formed from substantially inextensible cords, and a transverse flexure element consisting of a longitudinally-extending continuous band of laminated rubberized fabric, the laminations forming a plurality of parallel sections extending transversely of the belt.

7. A side driving belt of the V-type having a longitudinal tension resisting core formed from substantially inextensible cords, and a transverse flexure element consisting of a longitudinally-extending continuous band of laminated rubberized fabric, the laminations forming a plurality of parallel sections extending transversely of the belt, said transverse flexure element being located on the pulley side of the tension core.

8. A side driving belt of the V-type having a longitudinal tension resisting core formed from substantially inextensible cords, and a transverse flexure element consisting of a longitudinally-extending continuous band of laminated rubberized fabric, the laminations forming a plurality of parallel sections extending transversely of the belt, the band having a thickness of substantially one-third the thickness of the belt.

9. A side driving belt of the V-type having a longitudinal tension resisting core formed from substantially inextensible cords, and a transverse flexure element consisting of a longitudinally-extending continuous band of laminated rubberized cord fabric, the laminations forming a plurality of parallel sections extending transversely of the belt, the several laminations each comprising a plurality of latex treated attached cords arranged in parallel relation to form fabric like sections, the planes of the sections being transverse to the neutral axis of the belt.

EUGENE H. WEBER.